Oct. 22, 1968     F. R. KINNAN     3,406,525
MACHINE FOR LAYING CABLE

Filed June 28, 1965     2 Sheets-Sheet 1

FRANK R. KINNAN
INVENTOR.

BY *J. D. Grinan Jr.*
AGENT

Oct. 22, 1968

F. R. KINNAN 3,406,525

MACHINE FOR LAYING CABLE

Filed June 28, 1965

FRANK R. KINNAN
*INVENTOR.*

BY J. D. Ginnan Jr.
AGENT

United States Patent Office 3,406,525
Patented Oct. 22, 1968

3,406,525
MACHINE FOR LAYING CABLE
Frank R. Kinnan, Camas Valley, Oreg., assignor to Henkels and McCoy, Inc., Blue Bell, Pa., a corporation of Pennsylvania
Filed June 28, 1965, Ser. No. 467,491
4 Claims. (Cl. 61—72.6)

ABSTRACT OF THE DISCLOSURE

A cable plow for burying conduits of various types operatively carried by the linked arms of a backhoe-type machine and including a vibratory unit located above the blade of the plow to induce vibration therein to advantageously lessen the ground resistance to advance of the plow therethrough. The cable plow includes means for offsetting the vibratory unit to induce rocking motion in the blade. Cable means in addition to the linked arms of the vehicle are utilized to transmit a part of the vehicle's pulling power to the cable plow.

---

This invention relates to cable or wire laying devices and more particularly to a ground engaging implement of this nature adapted for operative attachment to a prime mover and most advantageously to a prime mover or vehicle having a pair of linked positionable arms.

An important feature of this invention is the provision of a cable laying device designed for mounting on the arm of a backhoe-type machine and when so mounted provides an efficient means for laying below the surface of the ground electrical and telephone conduits as well as flexible piping. Cable laying equipment, in common use at present, is for the most part constructed for the laying of large diameter cable approximately of four inch diameter such as coaxial telephone cable. For such cable laying operations most devices are of necessity adapted for attachment to tractors of the track laying type. The use of such tractors in areas of limited space such as between building structures is impractical and further, the considerable damage to the turf requires costly manual effort to return to its pre-existing condition. Cable laying attachments for wheeled vehicles such as that disclosed in the U.S. Patent No. 2,812,731, do not remedy the situation since there remains a problem of maneuvering space and ground surface damage although to a lesser extent. With this in mind, the advantages of a cable plow in combination with the positionable members of a backhoe type machine become readily apparent.

Another important object of this invention is the provision of a cable laying attachment having a vibratory unit mounted thereon to allow the use of a smaller prime mover since the horizontal force required for the earth separating function of the cable laying device is substantially reduced.

A further object of this invention is the combination of a cable laying attachment with the normally bucket-carrying arm of a backhoe machine to provide a particularly useful machine for the laying of cable in areas of limited space. The linked arms of a backhoe and their ability of extended reach obviates a considerable amount of ground damage as would occur were the cable laying plow attached to the three point hitch of a tractor.

An additional feature of this invention is the provision of a ground separating instrument or plow blade which incorporates upwardly and rearwardly extending ridges on the sides thereof to allow the plow to be drawn through the ground in stabilized perpendicular relationship thereto resulting in a minimum of ground displacement and consequently reducing the amount of manual effort to replace the displaced sod or turf. In general, the ridges function as a means for urging the plow downwardly which previously was accomplished by the rake of the leading edge or shin of the plow causing substantial upward displacement of soil. Heretofore the limited use of substantially perpendicular plow blades has of necessity been in conjunction with extremely sturdy blade securing means.

The foregoing and other objects and advantages which will become subsequently apparent reside in the details of construction and operation as more fully hereinafter described and claimed, reference being had to the accompanying drawings forming a part hereof and in which:

FIGURE 1A is a fragmentary side elevational view of the positionable arms and the cable plow assembly of FIGURE 1 operatively disposed.

Figure 1:
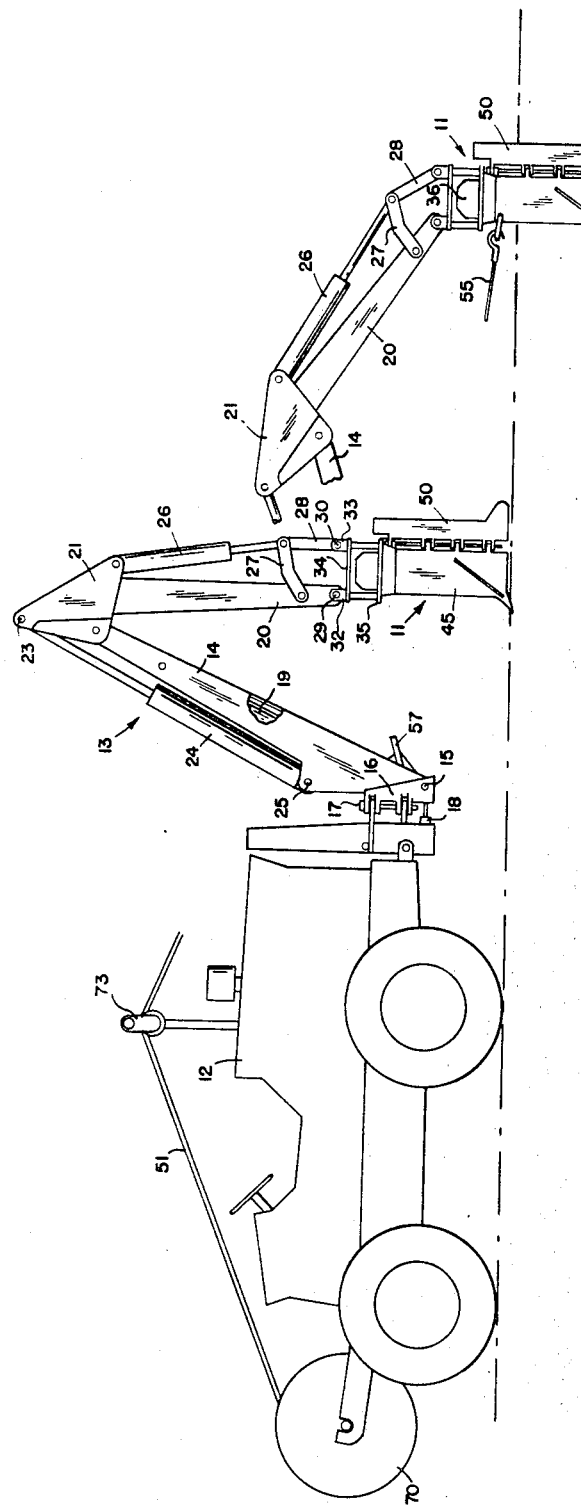
FIGURE 1 is a side elevational view of a vehicle having a pair of positionable arms and a cable plow assembly thereat attached.

With continuing reference to the drawings and particularly FIGURE 1 thereof, the cable plow assembly is indicated generally at 11 operatively carried by a wheeled vehicle 12 provided with a backhoe assembly indicated generally at 13 and both of the latter being of substantially conventional construction.

Backhoe assemblies commonly include a boom 14 pivotally mounted near its bottom end by a transverse horizontal pin 15 to a vehicle mounting bracket 16 for movement in a vertical plane. Horizontal movement of the backhoe assembly is provided for by a vertical pin 17 extending through interengaging flanges carried by the vehicle and the mounting bracket 16. A horizontally disposed vehicle mounted hydraulic cylinder 18 has its piston rod end pivotally attached to the lower end of bracket 16 in a laterally offset manner from a line common to the axis of pin 17 for horizontal positioning of the backhoe assembly thereabout. The backhoe assembly 13, as shown, further includes a double acting hydraulic cylinder 19 housed within the boom 14 for the raising and lowering thereof about the axis of pin 15 by virtue of the lower end of the cylinder 19 being hingedly attached (not shown) to bracket 16 and the piston rod end thereof attached adjacent the upper end of the boom. A working arm 20 is provided with a triangularly shaped housing 21 at its upper end which is rockably mounted at 22 at the outer or upper end of the boom 14. Also pivotally attached within the housing 21 as at 23 for imparting rocking motion to the arm 20 is the end of a piston rod of another double acting hydraulic cylinder 24, the lower end of which is hingedly attached as at 25 to the boom 14. Pivotally suspended at the outer end of housing 21 is another double acting hydraulic cylinder indicated at 26 which has its piston rod terminating in pivotal attachment with the interconnected ends of two pairs of toggle arms 27 and 28. In normal backhoe machine operation, a bucket is suspended from pivot means indicated at 29, adjacent the lower end of the arm 20, for powered swinging movement by means of the cylinder 26.

While a typical backhoe assembly has been described, it is to be recognized that satisfactory results could be obtained by the use of any type of structure having outwardly extending positionable arm members.

Although not shown, the backhoe assembly includes the normal circuitry for the selective actuation of its hydraulic components.

Attachment of the cable plow assembly 11 to the working arm 20 and the lower pair of toggle arms 28 is provided by pins 29 and 30 which extend respectively through forward pair and a rearward pair of lugs 32 and 33 carried by a plate 34 of a vibrator platform structure. Spaced below and secured in parallel relationship to plate 34 is a vibrator platform 35 on which on commercially available vibratory unit or vibrator 36 is secured by means of four bolts 37 extending through collars 38 carried by the vibrator. The vibrator 36 is preferably of the hydraulically driven type although other types would be satisfactory. Tubular supports 39, 40, 41 and 42 for the plate 34 are secured as by welding to the opposing inner surfaces of the plate 34 and platform 35.

Figure 2:
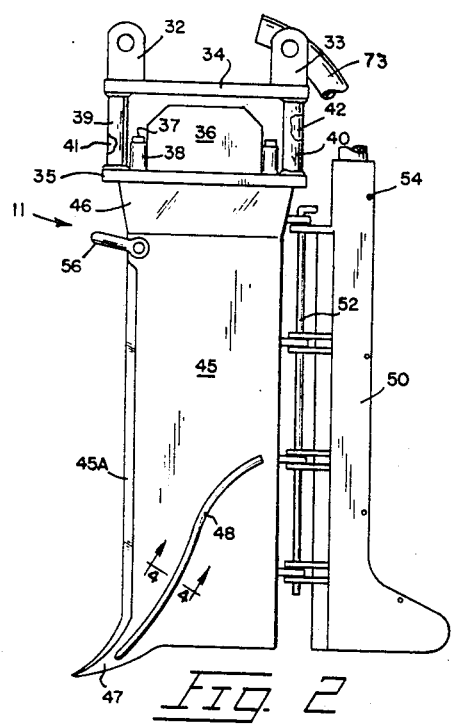
FIGURE 2 is a side elevational view of one form of the cable plow assembly.
Figure 3:
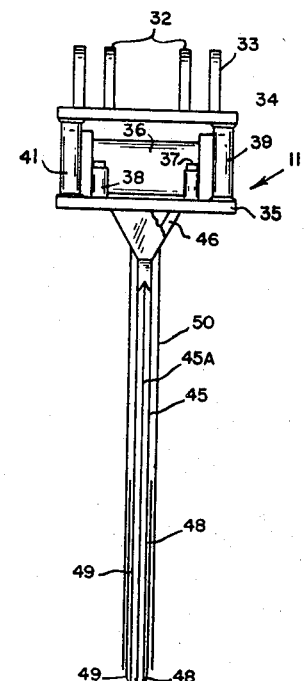
FIGURE 3 is an end elevational view of the left or forward end of the cable plow assembly of FIGURE 2.
Figure 4:
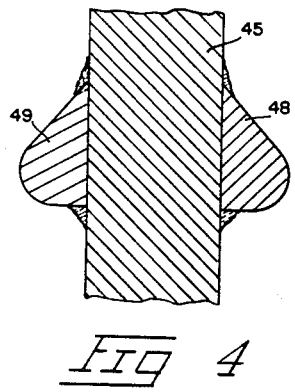
FIGURE 4 is a sectional view taken approximately along line 4—4 of FIGURE 2.

With continuing reference to the structure of the cable plow assembly, as best shown in FIGURES 2 and 3, a vertically depending plow blade 45 is carried by platform 35 and is laterally braced by diagonally positioned plate members 46 welded to the plow blade near its upper end and to the underside of platform 35. The leading edge or shin portion 45A of the plow blade 45 is V-shaped for earth separating purposes and terminates at its bottom end in a downward and forward direciton on a tooth-like point 47 of like direction. Extending upwardly and rearwardly relative to the plow blade's movement through the ground, are a pair of ridges 48 and 49 provided on the sides of the blade 45. Each ridge projects outwardly a distance approximately one-half the width of the plow blade as viewed in FIGURE 4. As the plow blade advances through the ground, the point 47 and particularly ridges 48 and 49 exert a downward resultant force on the blade permitting it to be drawn through the ground in perpendicular relationship to the ground line thus reducing to a minimum undesirable soil heaving. Heretofore leading edges of cable plow blades are generally formed on a rearward rake angle to provide a downward resultant force to oppose the tendency of the blade to ride upward out of the ground as it is pulled forward resulting in considerable soil displacement.

Pivotally attached along the trailing edge of the plow blade 45 is a vertically disposed cable shoe 50 which is rectangular in section to receive the downwardly passing conduit 51. The shoe is adapted to swing horizontally about the axis of a rod 52 which extends downwardly substantially the length of the blade through flanges carried thereby and forwardly extending flanges of the cable shoe. Providing the rearward wall of the cable shoe 50 is a removable plate 53 secured by pins 54 and which curves rearwardly at its lower end to provide a cable exit.

In areas where the soil is of a type presenting unusual resistance to the advancement of the plow blade 45 it has been found advantageous to link the blade to the vehicle 12 by means of a cable or chain 55 (FIG. 1A) which reduces loads on the hydraulic cylinders. A shackle 56 is attached through an aperture in the forward and upper end of the plow blade 45. A lug 57 is secured to the lower end of the boom 14 for pulling engagement with the opposite end of the cable or chain 55.

Figure 5:
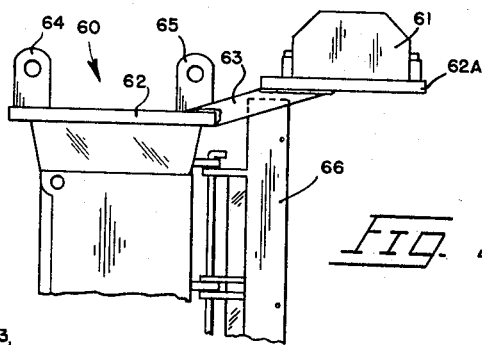
FIGURE 5 is a fragmentary side elevational view of the upper end of a modified form of cable plow assembly.

A modified form of cable plow assembly is indicated generally at 60 in FIGURE 5 wherein a vibrator 61, similar to vibrator 36, is mounted on a rearwardly disposed plate 62A which is supported by platform 62 by means of a pair of braces 63, all being part of a platform structure. Lugs 64 and 65 are the equivalent of lugs 32 and 33 of the first form of the invention as is the cable shoe 66 with the cable passing downwardly between the extension 62A and the platform 62.

A reel 70 containing a supply of cable or flexible conduit is supported by a pair of arms 71 carried by the vehicle chassis. The cable 51 is entrained over suitable supporting means as at 73 prior to entering the cable shoe.

Operation

FIGURE 1A illustrates the first form of the cable plow assembly operatively disposed in the ground to the desired depth which will vary with the type of cable or flexible conduit being laid. For the laying of small to intermediate size cable, a plow blade capable of penetration up to thirty-two inches has been found adequate. Obviously, the type of soil and the sturdiness of the backhoe assembly as well as the tractive force of the vehicle are prime factors in determining the practical depth of penetration of the plow assembly.

The cable laying operation is initiated by the lower part of hte cable plow assembly being positioned to a specified depth within a previously dug hole. The end of the cable is staked or otherwise secured within the hole for retention prior to the advancement of the plow. The cable extends upwardly through the shoe 50 and is fed from a cable reel 70 which may be carried by the vehicle 12, as shown, or by another vehicle.

As the cable plow assembly is pulled through the soil, the cable 51 payed out from the reel, through the guide means provided and is utlimately embedded at the desired depth. While most laying operations will entail the geometry of the backhoe assembly being fixed, it is understood that for short runs of the cable it is feasible the same be accomplished by movement of the backhoe assembly with the vehicle remaining immobile.

Figure 6:
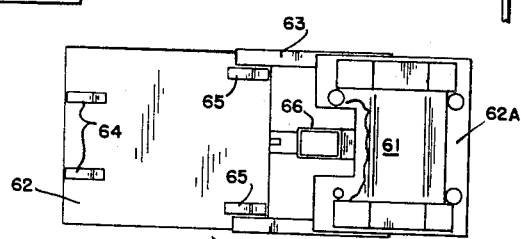
FIGURE 6 is a plan view of the modified form of cable plow assembly shown in FIGURE 5 with parts broken away for purposes of illustration.

The vibrator 36 has a primary function of reducing the force required to pull the plow blade 45 through the soil by imparting a vertical vibratory action to the blade. For some cable laying operations, such as when soil conditions are favorable and the cable depth relatively shallow it is entirely practical to lay cable with the vibrator inoperative. In the modified form of the invention of FIGURES 5 and 6, the installation of the vibratory unit off center from the plow blade's vertical centerline results in a horizontal vibratory force being imparted to the blade simultaneously with the vertical vibratory movement to effect a gyratory blade motion.

While I have shown particular forms of embodiment of my invention, I am aware that many minor changes therein will readily suggest themselves to others skilled in the art without departing from the spirit and scope of the invention. Having thus described my invention, what I claim as new and deisre to protect by Letters Patent is:

1. A cable plow assembly of the type described for pivoted attachment to the working arm of a backhoe machine said plow comprising;
   a vertically disposed plow blade having a leading and a trailing edge and adapted for soil separating horizontal movement by the prime mover,
   a cable shoe hingedly attached along the trailing edge of said blade for downward passage therethrough of a cable,
   a vibratory unit associated with said plow blade to induce vibratory motion therein, and
   attachment means carried by the upper end of said plow blade and including a normally horizontally disposed platform structure secured transversely of the upper end of said blade to support said vibratory unit and having upwardly projecting lugs horizontally spaced apart on said platform structure and apertured for pivot pin attachment to said arm and for pinned attachment to independently positionable toggle arms carried by said working arm whereby upon said cable plow assembly being located at varying distances from the backhoe machine by said working arm the desired relationship of the plow blade to the ground may be maintained by means of the individually positionable toggle arms.

2. The cable plow assembly as claimed in claim 1 wherein said vibratory unit is supported by said platform structure in a horizontally offset manner relative thereto to impart orbital motion to said plow blade.

3. The cable laying plow assembly as claimed in claim 1 wherein said plow blade and said backhoe machine are additionally linked together by a load carrying tension member.

4. In combination, the working arm of a backhoe type vehicle, a cable laying plow assembly carried at the end of said arm and having an upright blade member adapted for advancement through the ground by said vehicle in a predetermined angular relationship to the ground, said plow assembly including attachment means supported at the upper end of said blade member for attachment to the working arm of the vehicle and including a normally horizontally disposed platform structure secured transversely of the upper end of said blade and having upwardly projecting lugs horizontally spaced apart on said platform structure and apertured for pivot pin attachment to said working arm and for pinned attachment to independently positionable toggle arms swingably carried by said working arm whereby upon independently positioning of the swingably carried toggle arms the plow assembly may be retained in the desired predetermined angular relationship to the ground regardless of the inclination of the working arm, said platform structure including a platform extension horizontally offset from the upper end of the blade member and thereat supporting a vibratory unit to effect gyratory blade motion.

References Cited

UNITED STATES PATENTS

| | | | |
|---|---|---|---|
| 29,285 | 7/1860 | Karr | 37—193 |
| 3,033,394 | 5/1962 | Kashergen. | |
| 3,060,696 | 10/1962 | Lang | 61—72.6 |
| 3,084,817 | 4/1963 | Lovrenich | 37—103 X |
| 3,139,199 | 6/1964 | Van Auwelaer | 37—103 X |
| 3,211,236 | 10/1965 | Patton. | |
| 3,222,876 | 12/1965 | Harmstorf | 61—72.6 X |
| 2,949,871 | 8/1960 | Finn. | |

FOREIGN PATENTS 1,320,979  2/1963  France.

EARL J. WITMER, *Primary Examiner.*